United States Patent
Kowalewski et al.

[11] Patent Number: 6,098,490
[45] Date of Patent: Aug. 8, 2000

[54] UNIVERSAL ACTUATOR ASSEMBLY

[75] Inventors: Thomas Joseph Kowalewski, Rochester Hills; Matthew John Karl, Clarkston; Thomas Grzanka, Lexington; Robert Milne, Sterling Heights; Eric Michael Fischer, Davisburg; Vasanth Suratkal, Troy, all of Mich.

[73] Assignee: General Motors Corporation, Detroit, Mich.

[21] Appl. No.: 08/985,649

[22] Filed: Dec. 5, 1997

[51] Int. Cl.⁷ .................................. G05G 1/08; F16C 1/10
[52] U.S. Cl. ..................... 74/506; 74/500.5; 74/501.5 R; 74/504
[58] Field of Search ............................... 74/501.5 R–506, 74/489, 473.13, 473.14, 475, 528, 523, 524, 525, 536

[56] References Cited

U.S. PATENT DOCUMENTS

| | | |
|---|---|---|
| 1,788,473 | 1/1931 | Smith . |
| 1,857,654 | 5/1932 | Mylar . |
| 2,725,248 | 11/1955 | Rimkus .................................. 292/125 |
| 3,062,033 | 11/1962 | Schmalfeldt ............................. 70/256 |
| 4,945,784 | 8/1990 | Gergoe ................................ 74/501.5 R |
| 4,998,758 | 3/1991 | Kowalczyk et al. .................... 292/201 |
| 5,233,849 | 8/1993 | Forbers ..................................... 70/256 |
| 5,241,877 | 9/1993 | Chen ........................................ 74/489 |
| 5,476,019 | 12/1995 | Cheever et al. .......................... 74/506 |
| 5,685,198 | 11/1997 | Hawkins ................................ 74/502.2 |
| 5,823,058 | 10/1998 | Arbeiter ............................... 74/506 X |

FOREIGN PATENT DOCUMENTS

| | | | |
|---|---|---|---|
| 0585473 A1 | 3/1994 | European Pat. Off. ................. 74/506 |
| 59-9724 | 1/1984 | Japan ................................ 74/501.5 R |
| WO 88/04716 | 6/1988 | WIPO ..................................... 74/506 |

*Primary Examiner*—Vinh T. Luong
*Attorney, Agent, or Firm*—Charles E. Leahy; Kathryn A. Marra

[57] ABSTRACT

A trunk lid has an externally operated key lock cylinder that operates a latch mechanism inside the trunk by a cable assembly. The key lock cylinder is connected to the cable assembly by a universal actuator assembly including a housing having a ferrule for attachment to a sheath of the cable assembly. The universal actuator assembly further includes an attachment sleeve that is attached to the key lock cylinder in a predetermined angular orientation. The attachment sleeve has one end disposed in the chamber of the housing, with the one end having a plurality of radial teeth that engage radial lugs in the housing to index the sleeve with respect to the housing in a selected angular orientation to reduce the length of the cable assembly that is required. A rotor rotatably disposed in the housing has a central drive aperture for being driven by the key lock cylinder and an eccentric connector aperture for driving the cable assembly. A plurality of eccentric connector apertures may be provided to increase versatility.

10 Claims, 3 Drawing Sheets

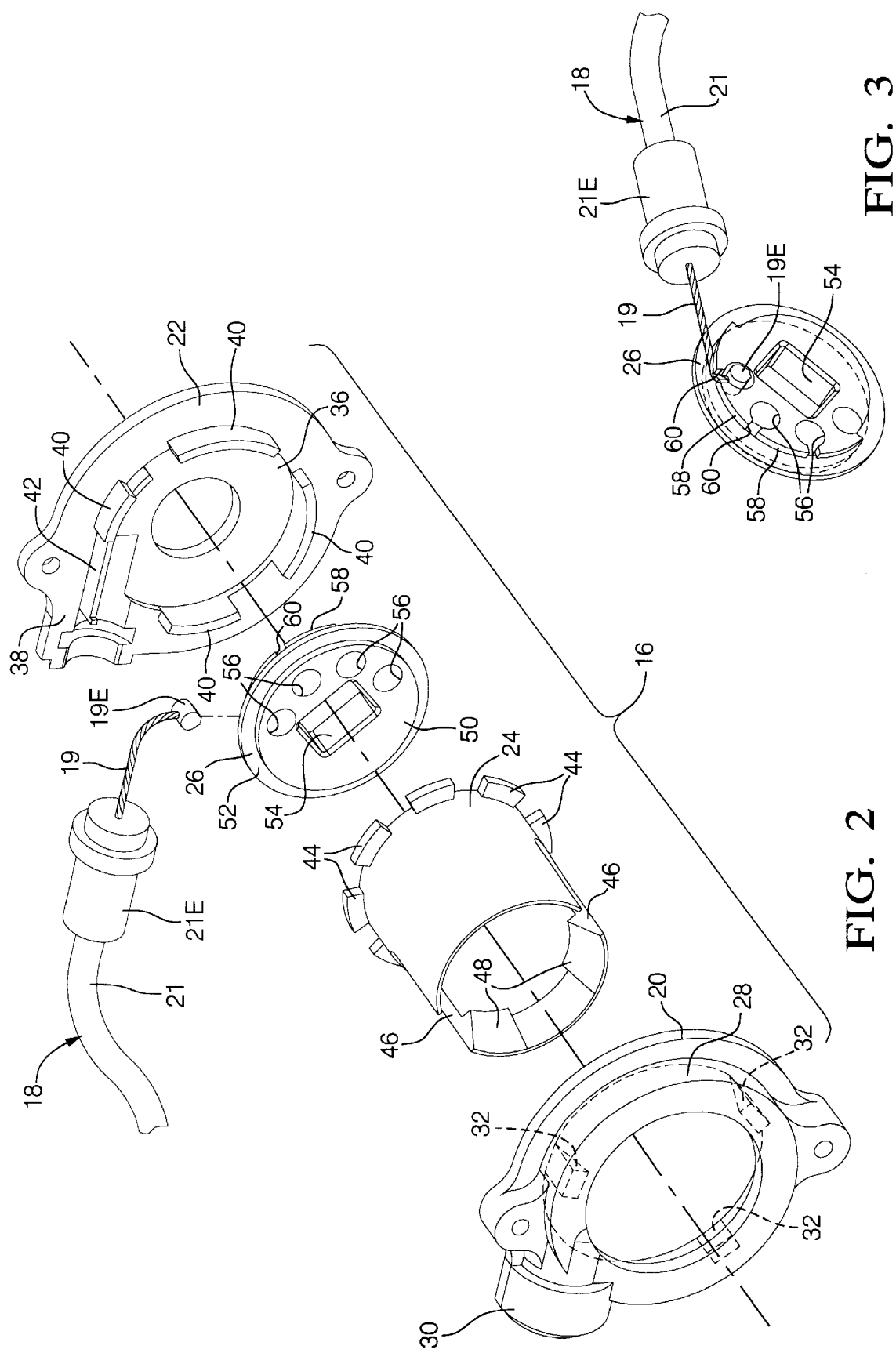

UNIVERSAL ACTUATOR ASSEMBLY

This invention relates generally to an actuator assembly and more particularly to a universal actuator assembly for use with an operator, such as a key lock cylinder for the remote operation of a mechanical device, such as a latch mechanism.

BACKGROUND OF THE INVENTION

An automotive closure, such as a deck lid for an automobile trunk, is hinged to swing between open and closed positions and conventionally includes a latch mechanism that is attached to the inner surface of the deck lid. The latch mechanism functions in a well know manner to lock the deck lid in the closed position or release the deck lid to be opened manually. The latch mechanism is operated remotely from the exterior of the automobile trunk by inserting and turnings a key in a key lock cylinder that extends through deck lid and is operatively connected to the latch mechanism usually by an actuator assembly and a cable assembly located inside the automobile trunk.

The position of latch mechanism with respect to key lock cylinder and actuator assembly varies with respect to angle and distance for different model automobiles. The cable assembly that runs from latch mechanism to actuator assembly is an expensive item, comprising a wire with end connectors that slides in a sheath with end connectors. In the past, the length of the assembly cable that is required has been reduced by providing a unique actuator assembly for each different model automobile resulting in a proliferation of parts and high tooling costs.

SUMMARY OF THE INVENTION

The object of this invention is to provide a universal actuator assembly that reduces the length of the cable assembly that is required for several different model automobiles thereby reducing the number of parts in inventory and the tooling costs.

A feature of the universal actuator assembly of the invention is that the actuator assembly aims a cable attachment of the actuator assembly at the cable attachment of the latch mechanism irrespective of the angular position of the latch mechanism with respect to the key lock cylinder.

Another feature of the universal actuator assembly of the invention is that the universal actuator assembly incorporates an indexing feature in the actuator assembly for adjusting the circumferential position of a cable attachment with respect to an attachment sleeve for an operator, such as a key lock cylinder thereby providing an actuator assembly of universal application.

Still another feature of the universal actuator assembly of the invention is that the various parts of the universal actuator assembly can be of molded plastic construction for economy.

Yet another feature of the universal actuator assembly of the invention is that the universal actuator assembly attaches to an operator, such as a key lock cylinder, in a predetermined angular orientation easily.

Still yet another feature of the invention is that the universal actuator assembly of the invention has a rotor that has a plurality of eccentric drive conformations for connecting the rotor to a cable assembly to increase the versatility of the universal actuator assembly.

These and other objects, features and advantages of the invention will become apparent from the description below, which is given by way of example with reference to the accompanying drawings.

BRIEF DESCRIPTION OF THE DRAWINGS

FIG. 2 is an exploded perspective view of the universal actuator assembly that is shown in FIG. 1;

FIG. 3 is a rear view of the rotor component that is shown in FIG. 1;

DESCRIPTION OF THE PREFERRED EMBODIMENT

Figure 1:
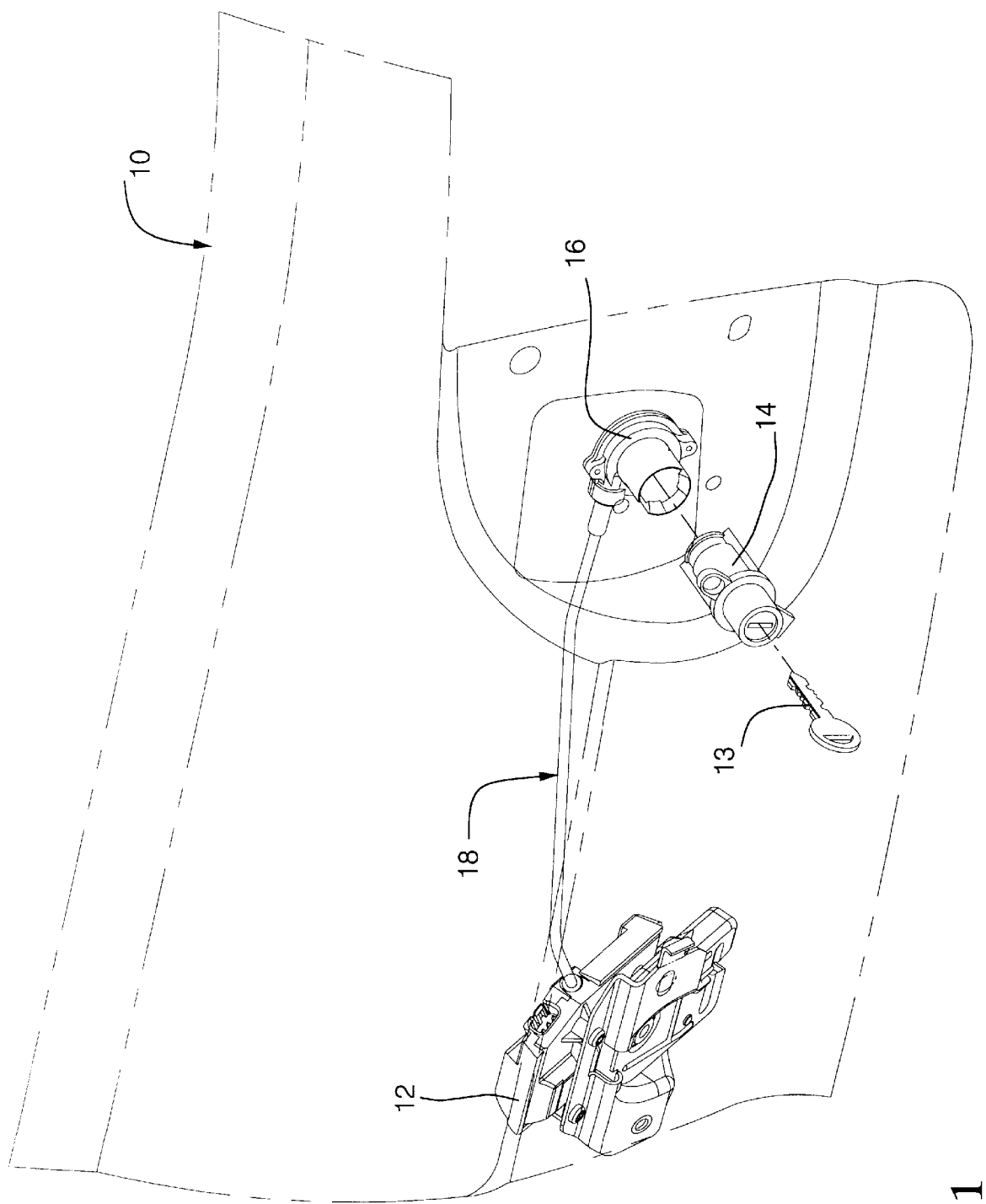
FIG. 1 is a perspective view of a vehicle closure that is equipped with a key lock cylinder and a universal actuator assembly for the key lock cylinder in accordance with the invention.
Figure 4:
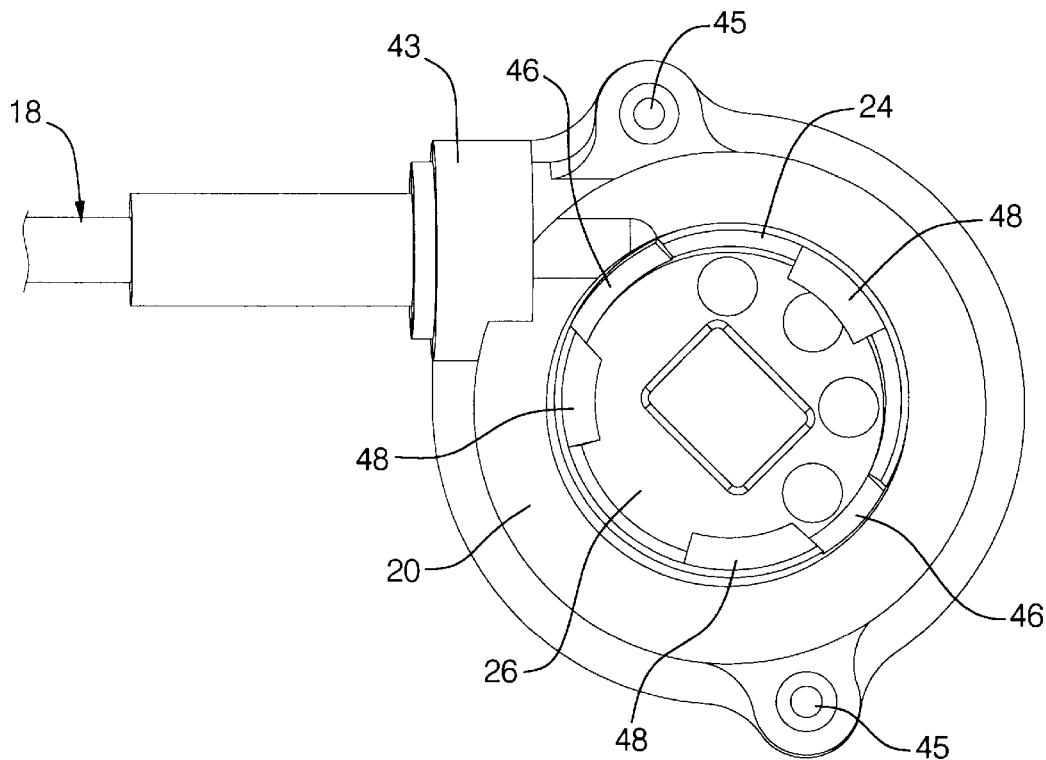
FIG. 4 is a rear view of the universal actuator assembly that is shown in FIGS. 1 and 2.
Figure 5:
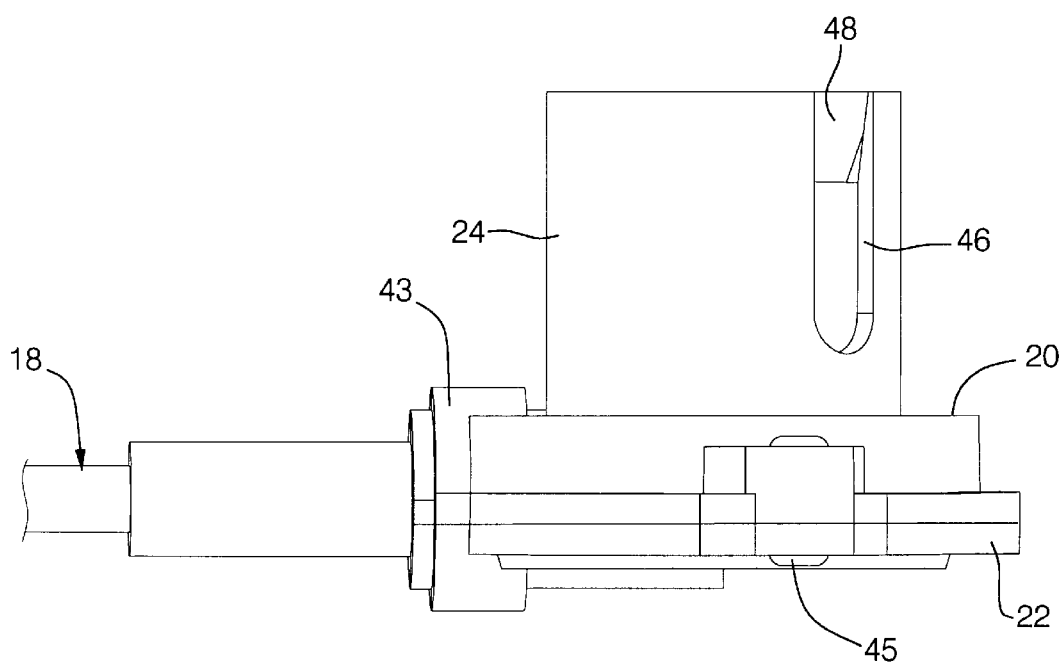
FIG. 5 is a top view of the universal actuator assembly that is shown in FIGS. 1 and 2.

Referring now to FIG. 1, an automotive closure, such as a deck lid for an automobile trunk, is generally indicated at 10. The deck lid 10 is hinged to swing between open and closed positions in a conventional manner and includes a latch mechanism generally indicated at 12. The latch mechanism 12, which can be of any suitable type, is attached to the inner surface of the deck lid 10 and functions in a well know manner to lock the deck lid 10 in the closed position or release the deck lid 10 to be opened manually. Latch mechanism 12 is operated remotely from the exterior of the automobile trunk by inserting and turning a key 13 in a key lock cylinder 14 that extends through deck lid 10 and is operatively connected to the latch mechanism 12 by an actuator assembly 16 and a cable assembly 18 located inside the automobile trunk.

The remote position of latch mechanism 12 with respect to key lock cylinder 14 and actuator assembly 16 varies with respect to angle and distance for different model automobiles. The cable assembly 18 that runs from latch mechanism 12 to actuator assembly 16 is an expensive item, comprising a wire 19 with end connectors 19e that slides in a sheath 21 with end connectors 21e. This invention reduces the length of the assembly cable 18 that is required by providing a universal actuator assembly that aims the cable attachment ferrule of the actuator assembly at the cable attachment of the latch mechanism 12 irrespective of the remote angular position of the latch mechanism. This is accomplished by incorporating an indexing feature in the actuator assembly for adjusting the circumferential position of the cable attachment ferrule with respect to the attachment for the key lock cylinder thereby providing an actuator assembly of universal application.

Actuator assembly 16 attaches to the end of key lock cylinder 14 mounted on deck lid 10 and operates remote latch mechanism 12 via cable assembly 18. Referring now to FIG. 2, actuator assembly 16 comprises housing parts 20 and 22, attachment sleeve 24 and rotor 26, all of which are preferably of molded plastic construction for economy.

Housing part 20 has a collar portion 28 and a ferrule portion 30. Collar portion 28 defines a central chamber with an enlarged concentric opening at the front end and ferrule portion 30 defines a tangential passage that leads out of the central chamber to the exterior of the actuator assembly 16. The central chamber of housing part 20 has a plurality of circumferentially spaced, radial lugs 32.

Housing part 22 also has a collar portion 36 and a ferrule portion 38. Collar portion 36 defines a second central chamber with a smaller concentric opening at the back end and ferrule portion 38 defines a second tangential passage that leads out of the second central chamber. Housing part 22 has arcuate fingers 40 at the edge of the second central chamber that fit into the central chamber of housing part 20 to center the housing parts 20 and 22 and hold attachment sleeve 24 in place when the housing parts 20 and 22 are fastened together as described below. The second central chamber and second tangential passage also have a wire guide 42.

Housing parts 20 and 22 have bosses with holes that receive metal rivets 45 to fasten the housing parts together as shown in Figures.

When housing parts 20 and 22 are fastened together, the individual central chambers of collar portions 22 and 36 form an enlarged central chamber and the individual tangential passages of ferrule portions 24 and 38 form a cable attachment ferrule 43 having an enlarged tangential passage leading out of the enlarged central chamber.

In order to provide an indexing function, attachment sleeve 24 has a plurality of radial teeth 44 at one end that are equal in width and evenly spaced in the circumferential direction. At the opposite end, sleeve 24 has two elongated slots 46 and three lock tabs 48 for attaching the actuator assembly 16 to the end of the key lock cylinder 14 in an angular orientation that is determined by wing portions of the key lock cylinder 14 fitting into elongated slots 46. During assembly sleeve 24 is inserted through the enlarged opening of housing part 20 so that it is coaxially disposed with respect to the housing part 20 and the radial teeth 44 are disposed in the central chamber of the housing part 20. Attachment sleeve 24 is then indexed with respect housing part 20 by selective engagement of teeth 44 with radial lugs 32 so that ferrule 43 is aimed at latch mechanism 12 when the actuator assembly 16 is attached to the end of the key lock cylinder 14. (The key lock cylinder 14 is usually mounted on the deck lid 10 so that the key slot is vertical).

In the example shown in the drawing, attachment has eight teeth so that the ferrule 43 can be positioned at forty-five degree (45°) increments in the circumferential direction. The incremental adjustment can be increased or decreased by increasing or decreasing the number of teeth. Moreover other indexing arrangements can be used.

Rotor 26 is rotatably disposed in the enlarged central chamber behind the indexed end of sleeve 24. Rotor 26 has a reduced diameter face 50 that pilots in the indexed end of sleeve 24 and an annular shoulder 52 that slides in a rotary fashion on the rear faces of teeth 44. Rotor 26 drive comformation such as also has a central drive aperture 54 a connector confirmation such as and a plurality of eccentric connector apertures 56. Central drive aperture 54 is rectangular and receives the rectangular drive rotor of the key lock cylinder 14 when the actuator assembly 16 is attached to the end of the key lock cylinder 14 so that rotor 26 rotates when the key is turned in the key lock cylinder 14. Eccentric connector apertures 54 extend through a back portion of rotor 26 that is reduced in diameter to provide space for the wire 19 of cable assembly 18 to fit between rotor 26 and arcuate fingers 40 in the radial direction. The reduced diameter portion on the back side of rotor 26 has a flange 58 that serves as a wire retainer and radial slots 60 that communicate with apertures 56 for attaching wire end connector 19e to rotor 26. While only one eccentric aperture is necessary, the plurality of eccentric apertures 56 provide additional versatility for actuator assembly 16

Actuator assembly 16 is assembled in the following manner. Attachment sleeve 24 is installed in the housing part 20 in the proper orientation as described above. The end connector 19e of wire 19 is attached in an appropriate aperture 56 of rotor 26. Rotor 26 is then inserted in the indexed end of sleeve 24 and end attachment 21e of cable sheath 21 is inserted into the tangential passage of ferrule portion 30. Housing part 22 is then mated to housing part 20. Housing parts 20 and 22 are then fastened together by metal rivets 45, trapping rotor 26 and the indexed end of sleeve 24 inside the enlarged chamber formed by housing parts 20 and 22 and the attachment end 21e of cable sheath 21 in ferrule 43. Actuator assembly 16 is then attached to the end of key lock cylinder 14 by inserting the end of key lock cylinder 14 in attachment sleeve 24 until it is retained by lock tabs 48. The remote end of the cable assembly 18 may be attached to latch mechanism 12 either before or after actuator assembly 16 is attached to key lock cylinder 14.

While the actuator assembly of the invention illustrated in conjunction with a key lock cylinder and a remote latch mechanism, other applications are also possible where a mechanical device is remotely controlled by a cable assembly. In other words, many modifications and variations of the present invention in light of the above teachings may be made. It is, therefore, to be understood that, within the scope of the appended claims, the invention may be practiced otherwise than as specifically described.

What is claimed is:

1. A universal actuator assembly for use with a key lock cylinder for remote operation of a latch mechanism via a cable assembly comprising;

a first housing part having a first central chamber and a first tangential passage in communication with the first central chamber, the first central chamber having a plurality of circumferentially spaced radial lugs, a second housing part having a second central chamber and a second tangential passage in communication with the second central chamber, means to fasten the first housing part and the second housing part together to form a housing having an enlarged central chamber and an enlarged tangential passage in communication with the enlarged central chamber, the enlarged central chamber comprising the first central chamber and the second central chamber, the enlarged tangential passage comprising the first tangential passage and the second tangential passage, an attachment sleeve adapted for attachment to the key lock cylinder in a predetermined angular orientation, the sleeve being coaxially disposed with respect to the housing in a selected angular orientation and having one end disposed in the enlarged central chamber of the housing, the attachment sleeve having a plurality of radial teeth at the one end that engage the radial lugs of the housing to index the attachment sleeve with respect to the housing, a rotor rotatably disposed in the enlarged central chamber of the housing, rotor having a central drive aperture whereby the rotor is adapted to be driven by the key lock cylinder when the actuator assembly is attached to the key lock cylinder by the attachment sleeve, and the rotor having an eccentric connector aperture whereby the rotor is adapted to drive the cable assembly when an end of the cable assembly is operatively attached to the actuator assembly at the enlarged tangential passage.

2. The universal actuator assembly as defined in claim 1 wherein the rotor has a plurality of eccentric connector apertures.

3. The universal actuator assembly as defined in claim 1 wherein the rotor has a reduced diameter face that is piloted in the one end of the attachment sleeve.

4. The universal actuator assembly as defined in claim 1 wherein the attachment sleeve has an elongated slot in an opposite end for orienting the universal actuator assembly with respect to the key lock cylinder.

5. The universal actuator assembly as defined in claim 3 wherein the attachment sleeve has lock tabs at the opposite end for retaining the universal actuator assembly on the key lock cylinder.

6. A universal actuator assembly for use with a key lock cylinder for remote operation of a latch mechanism via a cable assembly comprising;
- a housing having a ferrule for attachment to a sheath of a cable assembly,
- the housing defining a central chamber and the ferrule defining a tangential passage in communication with the central chamber,
- an attachment sleeve adapted for attachment to the key lock cylinder in a predetermined angular orientation, the attachment sleeve being coaxially disposed with respect to the housing and having one end disposed in the chamber of the housing,
- the attachment sleeve having a plurality of radial teeth at the one end that engage the radial lugs of the housing to index the sleeve with respect to the housing in a selected angular orientation,
- a rotor rotatably disposed in the central chamber,
- the rotor having a central drive aperture whereby the rotor is adapted to be driven by the key lock cylinder when the actuator assembly is attached to the key lock cylinder by the attachment sleeve, and
- the rotor having an eccentric connector aperture whereby the rotor is adapted to drive the cable assembly when a wire of the cable assembly is attached in the eccentric connector aperture and the sheath is attached to the ferrule.

7. The universal actuator assembly as defined in claim 6 wherein the rotor has a plurality of eccentric connector apertures and a reduced diameter face that is piloted in the one end of the attachment sleeve.

8. The universal actuator assembly as defined in claim 6 wherein the attachment sleeve has elongated slots in an opposite end for orienting the universal actuator assembly with respect to the key lock cylinder.

9. The universal actuator assembly as defined in claim 8 wherein the attachment sleeve has lock tabs at the opposite end for retaining the universal actuator assembly on the key lock cylinder.

10. A universal actuator assembly for use with an operator for remote operation of a mechanism via a cable assembly comprising;
- a housing; having a chamber and a tangential passage in communication with the chamber,
- the chamber having a plurality of circumferentially radial lugs,
- attachment sleeve adapted for attachment to an operator in a predetermined angular orientation, the attachment sleeve having one end that is disposed in the chamber of the housing and that has a plurality of radial teeth that engage the radial lugs of the housing to index the attachment sleeve with respect to the housing in a selected angular orientation,
- a rotor rotatably disposed in the chamber,
- the rotor having a drive conformation whereby the rotor is adapted to be driven by the operator when the actuator assembly is attached to the operator by the attachment sleeve, and
- the rotor having a connector conformation whereby the rotor is adapted to drive a cable assembly when an end of a cable assembly is inserted in the tangential passage and operatively connected to the connector conformation of the rotor.

* * * * *